(12) United States Patent
Pawar et al.

(10) Patent No.: US 11,419,172 B2
(45) Date of Patent: *Aug. 16, 2022

(54) CONTROL OF UE CONNECTIVITY INCLUDING CARRIER TRANSITION BEFORE TRANSITION FROM STANDALONE CONNECTIVITY TO DUAL CONNECTIVITY

(71) Applicant: Sprint Spectrum L.P., Overland Park, KS (US)

(72) Inventors: Hemanth B. Pawar, Brambleton, VA (US); Krishna Sitaram, Chantilly, VA (US); Shilpa K. Srinivas, Brambleton, VA (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

This patent is subject to a terminal disclaimer.

(21) Appl. No.: 17/247,519

(22) Filed: Dec. 15, 2020

(65) Prior Publication Data

US 2021/0105846 A1 Apr. 8, 2021

Related U.S. Application Data

(63) Continuation of application No. 16/450,205, filed on Jun. 24, 2019, now Pat. No. 10,904,937.

(51) Int. Cl.
*H04W 76/15* (2018.01)
*H04W 76/16* (2018.01)
*H04W 28/02* (2009.01)
*H04W 88/06* (2009.01)
*H04W 36/00* (2009.01)

(52) U.S. Cl.
CPC ....... *H04W 76/15* (2018.02); *H04W 28/0268* (2013.01); *H04W 76/16* (2018.02); *H04W 36/0069* (2018.08); *H04W 88/06* (2013.01)

(58) Field of Classification Search
CPC . H04W 76/15; H04W 76/16; H04W 36/0069; H04W 28/0268; H04W 88/06
See application file for complete search history.

(56) References Cited

U.S. PATENT DOCUMENTS

| | | | |
|---|---|---|---|
| 10,455,549 B2* | 10/2019 | Sebire | H04W 76/15 |
| 10,548,141 B1* | 1/2020 | Marupaduga | H04L 5/0032 |
| 10,716,158 B1* | 7/2020 | Pawar | H04L 5/0058 |
| 10,750,413 B1* | 8/2020 | Raghunathan | H04W 76/27 |
| 10,834,637 B1* | 11/2020 | Pawar | H04W 28/0226 |
| 11,012,863 B1* | 5/2021 | Marupaduga | H04W 16/14 |
| 11,051,312 B1* | 6/2021 | Marupaduga | H04W 72/0453 |
| 2016/0338039 A1* | 11/2016 | Van Der Velde | H04W 72/0413 |
| 2019/0037417 A1* | 1/2019 | Lei | H04W 72/085 |

(Continued)

*Primary Examiner* — Min Jung

(57) ABSTRACT

When a user equipment device (UE) is served with standalone connectivity by a first access node on a first carrier, the first access node could detect a trigger for transitioning the UE from the standalone connectivity to dual connectivity. In response to at least the trigger, the first access node could then (i) transition the UE from the first carrier to a second carrier selected based on the second carrier being lower in frequency than the first carrier, so as to help facilitate quality communication in the dual connectivity service, and then (ii) transition the UE from the standalone connectivity to the dual connectivity.

20 Claims, 4 Drawing Sheets

(56) References Cited

U.S. PATENT DOCUMENTS

| | | | | |
|---|---|---|---|---|
| 2020/0178332 A1* | 6/2020 | Sharma | ................ | H04W 80/08 |
| 2020/0323005 A1* | 10/2020 | Chin | ............... | H04W 36/00837 |
| 2020/0323019 A1* | 10/2020 | Vargas | ................ | H04W 76/15 |
| 2021/0014667 A1* | 1/2021 | Lovlekar | ............... | H04W 88/06 |

* cited by examiner

CONTROL OF UE CONNECTIVITY INCLUDING CARRIER TRANSITION BEFORE TRANSITION FROM STANDALONE CONNECTIVITY TO DUAL CONNECTIVITY

REFERENCE TO RELATED APPLICATION

This is a continuation of U.S. patent application Ser. No. 16/450,205, filed Jun. 24, 2019, the entirety of which is hereby incorporated by reference.

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has embraced various generations of radio access technologies, in a continuous effort to increase available data rate and quality of service for end users. These generations have ranged from "1G," which used simple analog frequency modulation to facilitate basic voice-call service, to "4G"—such as Long Term Evolution (LTE), which now facilitates mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each coverage area could operate on one or more radio-frequency (RF) carriers, each of which could be frequency division duplex (FDD), defining separate frequency channels for downlink and uplink communication, or time division duplex (TDD), with a single frequency channel multiplexed over time between downlink and uplink use.

Further, on the downlink and uplink, each carrier could be structured to define various physical channels including time-frequency resources for carrying information between the access node and UEs. For example, the air interface could be divided over time into frames, each divided in turn into subframes and timeslots, and the carrier bandwidth (frequency width of the carrier on the downlink and/or uplink) could be divided over frequency into subcarriers, which could be grouped within each subframe and timeslot to define physical resource blocks (PRBs) in which the subcarriers can be modulated to carry data.

In addition, certain resources on the downlink and/or uplink of each such carrier could be reserved for special purposes. For instance, on the downlink, certain resources could be reserved to define a reference signal that UEs could measure in order to determine coverage strength, other resources could be reserved to carry downlink control-plane signaling from the access node to UEs, and other resources could be reserved to carry user-plane communications from the access node to UEs. And on the uplink, certain resources could be reserved to carry uplink control-plane signaling from UEs to the access node, and other resources could be reserved to carry user-plane communications from UEs to the access node.

OVERVIEW

In example operation, when a UE enters into coverage of such a network, the UE could initially scan for and detect threshold strong coverage of an access node on a carrier, and the UE could responsively engage in signaling with the access node to establish a Radio Resource Control (RRC) connection between the UE and the access node. Further, if appropriate, the UE could then engage in attach signaling with a core-network controller to attach and thus register for service, and the core-network controller could coordinate setup for the UE of one or more user-plane bearers, including for each bearer an access-bearer portion that extends between the access node and a core-network gateway that provides connectivity with a transport network and a data-radio-bearer (DRB) portion that extends over the air between the access node and the UE.

Each such bearer could have a respective quality-of-service (QoS) class indicator (QCI) that defines certain QoS performance characteristics for the bearer, such as whether or not the bearer has a guaranteed bit rate (GBR or non-GBR), what the packet-delay budget is for the bearer, what the allowed packet error rate is for the bearer, and so forth. For instance, one bearer that could be set up initially for the UE could be a non-GBR best-efforts bearer, perhaps a QCI 9 bearer, for carrying general packet-data communications. Further, if the UE subscribes to voice-over-packet (VOP) calling service, another bearer that could be set up initially for the UE could be a VOP signaling bearer, perhaps a QCI 5 bearer, for carrying Session Initiation Protocol (SIP) or other such signaling that would be used to set up or tear down VOP calls. Other examples are possible as well.

Once the UE is connected and attached, with one or more such bearers established, the access node could then serve the UE with packet-data communications.

For instance, when the core-network gateway receives packet-data for transmission to the UE, the data could flow over an appropriate access bearer to the access node, and the access node could buffer the data, pending transmission of the data over the associated DRB to the UE. With the example air-interface configuration noted above, the access node could then allocate downlink PRBs in an upcoming subframe for carrying at least some of the data to the UE. And in that subframe, the access node could transmit to the UE a scheduling directive that indicates which PRBs will carry the data, and the access node could transmit the data to the UE in those PRBs.

Likewise, on the uplink, when the UE has packet-data for transmission on the transport network, the UE could buffer the data, pending transmission of the data over an appropriate DRB to the access node, and the UE could transmit to the access node a scheduling request that carries a buffer status report (BSR) indicating the quantity of data that the UE has buffered for transmission. With the example air-interface configuration noted above, the access node could then allocate uplink PRBs in an upcoming subframe to carry at least some of the data from the UE and could transmit to the UE a scheduling directive indicating those upcoming PRBs, and the UE could accordingly transmit the data to the access node in those PRBs. And the data could then flow over the associated access bearer through the core network for output onto the transport network.

Further, when the UE is so served by an access node, the UE could also regularly monitor the strength of its coverage to help ensure that the UE is served with sufficient and/or the strongest available coverage. For instance, the UE could regularly measure reference-signal strength from the access node and, when the reference signal strength becomes threshold low could transmit a measurement report to the access node. And in response, the access node could then direct the UE to scan for coverage of other access nodes, and if the UE finds sufficiently strong coverage of another access node, the UE could transmit a measurement report to the serving access node, and the serving access node could coordinate handover of the UE to the other access node.

In addition, while a UE is so served by an access node, other bearers could be set up for the UE to facilitate carrying particular types of traffic. For example, if the UE is voice capable, a VOP call might be initiated for the UE, and the core network might responsively trigger setup for the UE of a dedicated GBR bearer, such as a QCI 1 bearer, appropriate for carrying voice traffic to and from the UE. As another example, if the UE engages in packet-based gaming communication, the network may set up for the UE a dedicated GBR bearer, such as a QCI 3 bearer, appropriate for carrying gaming traffic to and from the UE. Other examples are possible as well.

As the industry advances from one generation of RAT to the next, issues arise with the need for UEs to support potentially multiple RATs at once. With the transition from 4G LTE to 5G NR, for instance, networks and UEs may be configured to support use of both technologies concurrently, with an arrangement referred to as EUTRA-NR Dual Connectivity (EN-DC). With such an arrangement, a UE might include a 4G LTE radio and a 5G NR radio, and the 4G LTE radio could be served by a 4G LTE access node (evolved Node-B (eNB)) concurrently with the 5G NR radio being served by a 5G access node (next generation Node-B (gNB)). This arrangement could help support transition from 4G LTE technology to 5G NR technology and could also facilitate higher peak data rate, and possibly lower-latency, of communication by allowing data to be multiplexed over 4G LTE and 5G NR connections, among possibly other benefits.

More generally, dual connectivity could encompass connectivity on two or more RATs concurrently, to facilitate technology transitions or for other purposes. Dual connectivity can thus be distinguished from standalone connectivity, where a UE is served on just one RAT, such as just LTE for instance.

In a representative dual-connectivity arrangement, a first access node operating under a first RAT could serve as a primary anchor node for the dual-connectivity service, responsible for coordinating setup and teardown of dual-connectivity service for a UE, handling core-network control-plane signaling related to the dual-connectivity service, and controlling handover of the UE when appropriate. Whereas, a second access node operating under a second RAT could serve as a secondary node to provide increased data capacity for the UE. For example, with EN-DC, a 4G LTE eNB could operate as the anchor node, and a 5G NR gNB could operate as the secondary node.

When the UE enters into coverage of such a system, the UE could initially scan for and discover threshold strong coverage of a first access node under a first RAT (e.g., 4G coverage, for EN-DC), and the UE could responsively engage in signaling as discussed above to establish an RRC connection between the UE and that first access node. Further, the UE could engage in attach signaling with a core-network controller via the first access node, and the core-network controller could coordinate establishment for the UE of at least one bearer as discussed above.

The first access node could then serve the UE in a first-RAT standalone mode (i.e., under just the first RAT) with packet-data communications in the manner described above.

Further, when starting to serve the UE or subsequently while serving the UE, the first access node could detect (e.g., encounter) a trigger for transitioning the UE from being served with standalone connectivity by the first access node under the first RAT to being served instead with dual connectivity by the first access node under the first RAT and a second access node under a second RAT. By way of example, the trigger could be a determination that the UE is going to engage in a particular type of communication that might benefit from dual-connectivity service. For instance, the trigger could be a determination that the UE is going to engage in latency-sensitive communication or the like, which the first access node might learn based on setup for the UE of a bearer having a particular QCI value suggesting latency-sensitivity or the like.

Operating as a master node for dual-connectivity service, the first access node could then responsively engage in a process to establish for the UE a secondary RRC connection with a second access node under a second RAT, so that the first and second access nodes can then cooperatively provide the UE with dual-connectivity service. For instance, the first access node could direct the UE to scan for secondary coverage under the second RAT and could receive in response from the UE a report that the UE detected threshold strong coverage of the second access node. And the first access node could then coordinate setup of dual-connectivity service with the UE being served by the first access node and the second access node.

While the specifics of setting up dual connectivity may vary from implementation to implementation, in an example, the first access node could engage in signaling with the second access node, with the UE, and with the core-network controller, to coordinate setup of the dual-connectivity service. For instance, the first access node could engage in signaling with the UE and with the second access node to arrange for setup of a secondary connection between the UE and the second access node. And the first access node could engage in signaling with the core-network controller and/or with the second access node to establish for the UE a split-bearer arrangement so that the first access node could serve a portion of the UE's data communications and the second access node could serve another portion of the UE's data communications.

When considering whether to establish dual-connectivity service for a UE, the first access node may require that the UE have at least a minimum threshold quality of communication with the first access node—since the first access node will function as the anchor node for the UE's dual-connectivity service. As part of this, the first access node may require, as a condition for setting up the dual-connectivity service, that the UE have at least a predefined minimum threshold high level of uplink throughput with the first access node. The first access node could determine this by evaluating actual uplink data throughput from the UE. Alternatively, the first access node could consider whether the UE's most-recently reported downlink signal strength (e.g., reference signal receive strength (RSRP)) or other reported channel quality from the first access node is at least a predefined threshold minimum level that is deemed to correlate with likely sufficiently high uplink throughput or otherwise with sufficiently high quality communication with the first access node.

If the first access node determines that the UE's quality of communication with the first access node is at least predefined threshold high quality, then the first access node may engage in processing to establish dual-connectivity service for the UE in response to the trigger for establishing such dual-connectivity service. Whereas, if the first access node determines that the UE's quality of communication with the first access node is not at least the predefined threshold high quality, then the first access node may forgo establishing dual-connectivity service for the UE.

Further, if dual-connectivity service gets set up for the UE, the first access node may then require that the UE maintain at least a minimum threshold quality of communication cooperatively with the first access node and the second access node, as a condition for maintaining the dual-connectivity service. For instance, the first access node may require, as a condition for maintaining the UE's dual-connectivity service, that the UE have at least a predefined minimum threshold level of an uplink throughput cumulatively across the UE's first connection with the first access node and the UE's second connection with the second access node. To evaluate this, the first access node may receive uplink-throughput reports from the second access node and may compile its own records as well, and the first access node may combine that information together to establish the UE's cumulative uplink throughput (e.g., on average over a recent sliding window).

If the first access node determines that the UE's uplink throughput with dual-connectivity service is at least predefined threshold high, then the first access node may maintain the UE's dual-connectivity configuration. Whereas, if the first access node determines that the UE's uplink throughput with dual-connectivity service is below the predefined threshold level, then the first access node may responsively de-configure the UE's dual connectivity service. Namely, the first access node may engage in signaling to de-configure the split-bearer configuration that was set up for the UE and may engage in signaling to release the second connection that was set up for the UE, thus transitioning the UE from being served with the dual connectivity back to being served with standalone connectivity by the first access node.

One technical consideration that may arise in this situation is what carrier the UE's first connection uses. Carriers of various frequencies might be available for use on the first RAT, and those carriers might differ from each other in terms of their path loss and therefore in terms how far from the first access node they could support sufficiently high-quality UE communication with the first access node. In general, lower-frequency carriers may have lower path-loss and may therefore support up to more distant communications, whereas higher-frequency carriers may have higher path-loss and may therefore have more limited range.

In an example system, for instance, one or more carriers might be defined in a relatively low-frequency band, such as B25 (FDD carriers in the range of 1850 MHz to 1915 MHz on the uplink and 1930 MHz to 1995 MHz on downlink), having relatively low path loss, whereas one or more other carriers might be defined in a relatively high-frequency band, such as B41 (2496 MHz to 2690 MHz), having higher path loss.

If a UE's first connection with the first access node is on a first carrier and the UE has relatively weak coverage of the first access node on that carrier, then, as discussed above, the first access node may decline to establish dual-connectivity service for the UE. Therefore, the UE may not benefit from dual-connectivity service.

Per the present disclosure, one way to help avoid this undesirable result is for the first access node to reconfigure the UE's first connection from being on the first carrier to instead being on a second carrier that the first access node selects based on the second carrier being lower in frequency than the first carrier. For instance, if the first connection is on a B41 carrier, the first access node could reconfigure the first connection to instead be on a B25 carrier. Doing this may help to reduce path loss thereby improve quality of the UE's coverage on the first connection, so that the first access node could then establish dual-connectivity service for the UE.

Note that the carrier at issue in this process could be the sole carrier on which the UE's first connection with the first access node is configured. In that case, the first access node could reconfigure the first connection from being on just the first carrier to being instead on just the second carrier.

Alternatively, the carrier at issue could be a primary, anchor carrier for carrier-aggregation service of the UE on the first connection where the UE is served on the first connection on the primary, anchor carrier in combination with one or more secondary component carriers. In that case, the first access node could reconfigure the first connection from having the first carrier be the primary component carrier for the carrier-aggregation service to instead having the second carrier be the primary component carrier for the carrier-aggregation service.

In addition, if the first access node is serving multiple UEs that each have dual-connectivity service including a respective first connection with the first access node, a further technical issue could arise if all of the UEs' first connections are configured on the same first carrier as each other. Namely, in that scenario, the load on that first carrier could become threshold high, which could present problems with supporting communications for some of the UEs.

Per the present disclosure, one way to help address this additional issue is for the first access node to detect the load situation on the first carrier and responsively reconfigure the first connection of each of one or more selected UEs from having the first carrier as anchor carrier for dual-connectivity service to instead having a second carrier as anchor carrier for dual-connectivity service. Here, in contrast to the scenario above, the second carrier could be higher in frequency than the first carrier; for instance, the first carrier could be a B25 carrier, and the second carrier could be a B41 carrier, among other possibilities.

In this implementation, the first access node could select one or more of the UEs to have their dual-connectivity anchor carrier be changed from the lower-frequency first carrier to the higher-frequency second carrier, with the selection of each such UE being based on a determination the UE is within uplink coverage range of the first access node on the higher-frequency second carrier. For instance, for each UE that has its first connection configured on the first carrier, the first access node could compare a geographic location of the UE with a pre-mapped uplink communication range of the first access node on the second carrier. And if the UE's geographic location is within that pre-mapped uplink coverage range of the first access node, then the first access node could select the UE as one to have its anchor carrier for dual connectivity reconfigured from being the first carrier to instead being the second carrier.

Reconfiguring the anchor carrier for dual-connectivity service of each of one or more selected UEs to be on the higher-frequency second carrier could help to reduce load on the first carrier and thereby increase the likelihood of retaining dual-connectivity service for each other UE whose anchor carrier for dual-connectivity service remains on the first carrier. Further, as the selecting of the one or more UEs is based on each selected UE being within uplink range of the first access node on the higher-frequency second carrier, each such selected UE may also be able to attain sufficiently high uplink throughput to also be able to retain its dual-connectivity service.

Note here as well that carrier at issue in this process could be the sole carrier on which the UE's first connection with the first access node is configured, or the carrier at issue could be a primary, anchor carrier for carrier-aggregation service on the UE's first connection, with the reconfiguration being as discussed above.

These as well as other aspects, advantages, and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a system that supports 4G LTE, 5G NR, and EN-DC service. However, it should be understood that the principles disclosed herein could extend to apply with respect to other scenarios as well, such as with respect to other RATs and other dual-connectivity configurations. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
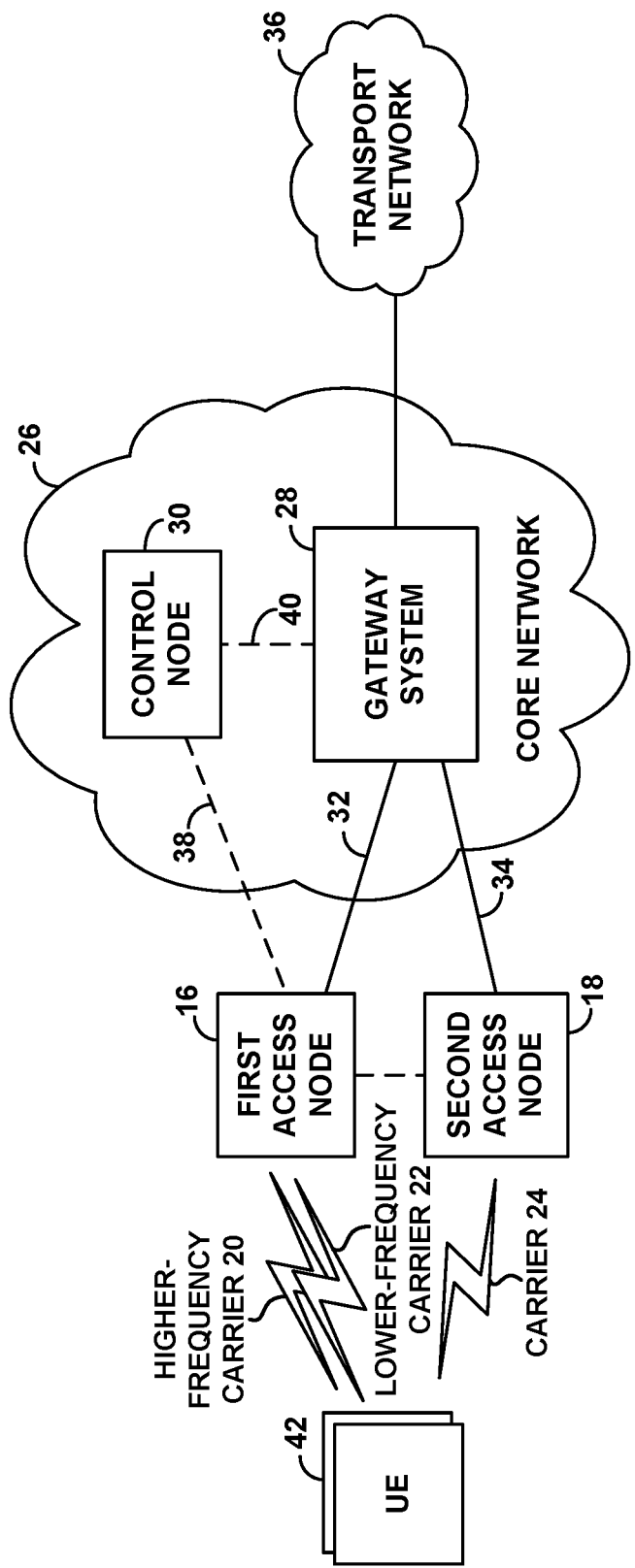
FIG. 1 is a simplified block diagram of an example network arrangement in which aspects of the present disclosure can be implemented.

FIG. 1 is a simplified block diagram of an example network arrangement that supports providing wireless-packet-data service according to 4G LTE and 5G NR protocols and providing EN-DC service.

The example network arrangement is shown including a representative first access node 16 and a representative second access node 18. In the example implementation, the first access node could be a 4G LTE eNB, thus providing coverage and service according to 4G LTE, and the second access node could be a 5G NR gNB, thus providing coverage and service according to 5G NR. The first access node 16 and second access node 18 could be co-located at a common cell site, sharing an antenna tower or other antenna structure, and sharing baseband hardware or the like, but being separately defined to provide discrete 4G LTE and 5G NR connections and service.

Further, the first access node and second access node could each be configured to provide respective coverage and service on one or more carriers each defining respective frequency bandwidth and air-interface resources for carrying communications wirelessly to/from served UEs. In particular, the first access node 16 is configured to provide coverage and service in accordance with 4G LTE on each of at least two carriers 20, 22, and the second access node 18 is configured to provide coverage and service in accordance with 5G NR on at least one carrier 24.

Of the carriers on which the first access node provides service, carrier 20 is a relatively high-frequency carrier, and carrier 22 is a relatively low-frequency carrier, i.e., carrier 20 is a higher frequency carrier than carrier 22. For example, carrier 20 might be a B41 carrier, and carrier 22 might be a B25 carrier, among other possibilities.

In an example implementation, the respective coverage provided on each carrier could be divided over time into frames, subframes, timeslots, and symbol segments, and could be divided over frequency bandwidth into subcarriers. As a result, the respective coverage could define an array of time-frequency resource elements, in which subcarriers can be modulated to carry data communications.

In each subframe, these resource elements could be divided into groups defining the PRBs noted above, which could be allocable by the associated access node on an as-needed basis to carry data communications as noted above. And certain resource elements per subframe could be reserved for other purposes, such as to carry a reference signal, synchronization signals, scheduling directives, acknowledgement messages, and other control signaling.

The 4G LTE air-interface and service provided by first access node 16 could differ from the 5G NR air-interface and service provided by 5G NR second access node 18 in various ways now known or later developed. For example, one may provide variable subcarrier spacing, but the other may provide fixed subcarrier spacing. As another example, one may have different symbol time segments than the other. As still another example, one may make use of different MIMO technologies than the other. And as yet another example, with TDD carriers, one may have a flexible TDD configuration and the other may have a fixed TDD configuration. Other examples are possible as well.

As further shown, the first access node and second access node are each connected with a core network 26, which includes a gateway system 28 and a control node 30. In an example core network, the gateway system 28 could include a serving gateway (SGW) and a packet-data network gateway (PGW) (neither shown), with the SGW having a communication interface 32 with the first access node and a communication interface 34 with the second access node, and with the PGW providing connectivity with a transport network 36 such as the Internet or a private network. And the control node 30 could be a mobility management entity (MME), which could have a communication interface 38 with the first access node and a communication interface 40 with the gateway system 28 (e.g., with the SGW).

Additionally, shown possibly within coverage of the first access node 16 and the second access node 18 are a number of UEs 42, each of which could take any of the forms noted above, among other possibilities.

As discussed above, when any such UE 42 initially enters into coverage of this network, the UE could discover coverage of the first access node 16 on a first carrier, such as by scanning predefined 4G LTE carriers to find a synchronization signal from the first access node and then determining that a reference signal from the first access node on the first carrier is strong enough to justify connecting. The UE could then engage in random-access signaling and RRC signaling with the first access node to establish a first RRC connection between the UE and the first access node on the first carrier. And the UE could then engage in attach signaling with the control node 30, via the first connection and the first access node, to register for service with the network, triggering the control node 30 to coordinate setup for the UE of at least a best-efforts bearer (e.g., QCI 9 bearer). The first access node could then serve the UE with standalone 4G LTE connectivity on the first connection.

The first carrier on which the UE is connected with the first access node could be the sole carrier on which the first connection is defined and could therefore be the sole carrier that carries all control-plane and user-plane communications between the UE and the first access node.

Alternatively, the first carrier could be the primary component carrier for carrier-aggregation service defined on the first connection, with the first access node having added one or more additional carriers each as a secondary component carrier for the carrier-aggregation service. In that case, the first carrier could be the anchor for certain key control-plane communications between the UE and the first access node.

Further, as discussed above, the first access node could detect a trigger for establishing EN-DC service for the UE. For instance, the first access node could detect bearer-setup signaling that indicates that the UE is going to engage in a communication that could benefit from EN-DC service, such signaling indicating setup for the UE of a bearer having a QCI value corresponding with latency-sensitive communication (e.g., a QCI value indicating that the bearer is a GBR bearer, has a particular delay-budget, and/or is for voice communication, gaming communication, video streaming communication, or the like). Alternatively or additionally, the first access node could engage in deep packet inspection or the like to determine from packet data flowing to or from the UE that the UE will be engaging in a communication that could benefit from EN-DC service (e.g., that the UE is currently engaging in such communication and therefore will continue to engage in such communication, or that the UE is engaged in signaling to set up such communication).

The first access node could then responsively work to set up EN-DC service for the UE. For instance, the first access node could send to the UE an RRC message that directs the UE to scan for and report any threshold strong coverage that the UE detects on 5G carriers. And upon receipt of such a report from the UE specifying that the UE detected threshold strong coverage of coverage of second access node 18, the first access node could then engage in signaling with that second access node and with the UE to coordinate setup of a second connection between the second access node and the UE. Further, the first access node could engage in signaling with the control node 30 and/or the second access node 18 to coordinate splitting of the UE's bearer(s) so as to enable the first access node and second access node to concurrently serve the UE over their respective connections with the UE.

Various split-bearer arrangements may be possible.

In one implementation, the split bearer could be established at the gateway system 28, with one bearer leg extending between the gateway system and the first access node and another bearer leg extending between the gateway system and the second access node. For instance, while maintaining the UE's access bearer between the first access node and the gateway system, the control node 30 could coordinate setup of a secondary access bearer between the second access node and the gateway system. With this arrangement, communications between the UE and the first access node could flow over the access bearer between the first access node and the gateway system, and communications between the UE and the second access node could flow over the access bearer between the second access node and the gateway system.

In another implementation, the split bearer could be established at the second access node, with the UE's access bearer extending between the gateway system and the second access node and a leg of the access bearer extending further between the second access node and the first access node. For instance, the control node 30 could coordinate transfer of the UE's access bearer from being between the gateway system and the first access node to instead being between the gateway system and the second access node, and the first access node and second access node could coordinate setup of the bearer leg between the first access node and the second access node. With this arrangement, communications between the second access node and the UE would flow over the access bearer between the second access node and the gateway system, and communications between the first access node and the UE would flow between the first access node and the second access node and likewise over the access bearer between the second access node and the gateway system.

And in yet another implementation, the split bearer could be established at the first access node, with the UE's access bearer still extending between the gateway system and the first access node, and with a leg of the bearer extending between the first access node and the second access node. For instance, the first access node could maintain the access bearer between the first access node and the gateway system, and the first access node and second access node could coordinate setup of the bearer leg between the first access node and the second access node. With this arrangement, communications between the first access node and the UE could flow over the access bearer between the first access node and the gateway system, and communications between the second access node and the UE could flow between the second access node and the first access node and likewise over the access bearer between the first access node and the gateway system.

Other split-bearer arrangements might be possible as well.

With dual-connectivity service so established through this and/or other steps, the first access node and second access node could then concurrently serve the UE over their respective connections with the UE, perhaps with both providing for both downlink and uplink scheduled data communication, or perhaps with both providing for downlink scheduled data communication but just one of them providing for uplink scheduled data communication.

On the downlink, for instance, some of the data destined to the UE could be buffered by the first access node for transmission to the UE, and the first access node could coordinate downlink transmission of data over the air from the first access node to the UE as discussed above. And other of the data destined to the UE could be buffered by the second access node for transmission to the UE, and the second access node could coordinate downlink transmission of that data over the air from the second access node to the UE as discussed above.

Likewise, when the UE has data to transmit, the UE could buffer some of that data for transmission to the first access node as discussed above and the UE could buffer other of that data for transmission to the second access node as discussed above. Thus, the UE could send to the first access node a BSR indicating how much data the UE has buffered for transmission to the first access node, and the first access node could coordinate uplink transmission of that data over the air from the UE to the first access node. And the UE could send to the second access node a BSR indicating how much data the UE has buffered for transmission to the second access node, and the second access node could coordinate uplink transmission of that data over the air from the UE to the second access node. Alternatively, the UE could limit its uplink transmission to just the second access node.

And as noted above, the first access node could require, as a condition for setting up EN-DC service for the UE, that the UE have sufficiently high quality communication with the first access node on the first connection, such as that the UE has reported sufficiently strong coverage of the first access node and/or has sufficiently high uplink throughput of communication to the first access node.

Unfortunately, however, there may be situations where the UE has relatively weak coverage of the first access node and therefore where the first access node would not set up EN-DC service for the UE even though the first access node has detected a trigger for setting up EN-DC service for the UE. As noted above, one such situation could be where the UE's first connection is on a relatively high-frequency carrier such as carrier 20 (e.g., as sole carrier of the first connection or as primary component carrier for carrier-aggregation service on the first connection), and where the UE is relatively far away from the first access node. In that situation, due to the relatively high path loss on that carrier, the UE may report relatively low RSRP from the first access node. And therefore, the first access node may decline to set up EN-DC service for the UE.

In this or other situations, as discussed above, when the first access node detects a trigger for setting up EN-DC service for the UE, the first access node could responsively reconfigure the UE's first connection to be on a lower-frequency carrier such as carrier 22, in an effort to improve quality of the UE's communication with the first access node, so that the first access node could then set up EN-DC service for the UE.

The process of the first access node reconfiguring the UE's first connection from being on the relatively high-frequency carrier 20 to being on the relatively low-frequency carrier 22 could initially involve the first access node engaging in RRC signaling with the UE to confirm that the UE is within coverage of the first access node on carrier 22, or the process may assume that the UE is within coverage of the first access node on carrier 22 based on carrier 22 having lower path loss than carrier 20.

Further, the process could involve the first access node engaging in RRC signaling with the UE to direct the UE to hand over from being connected with the first access node on carrier 20 to being connected with the first access node on carrier 22. Alternatively, in a scenario where carrier 20 is configured as the primary component carrier for carrier-aggregation service on the UE's first connection with the first access node and carrier 22 is configured as one of one or more secondary component carriers for carrier-aggregation service on the UE's first connection with the first access node, the first access node might engage in RRC signaling with the UE to swap carriers 20 and 22, so that carrier 22 would become the primary component carrier for the carrier-aggregation service and carrier 20 would become one of the one or more secondary component carriers for the carrier-aggregation service.

Once the first access node has so reconfigured the UE's first connection to be on a lower-frequency carrier, the first access node could then proceed to set up EN-DC service for the UE as discussed above, thus transitioning the UE from being served with standalone 4G LTE connectivity by the first access node on the reconfigured first connection to being served instead with EN-DC by the first access node on the reconfigured first connection and by the second access node 18 on a second connection.

Figure 2:
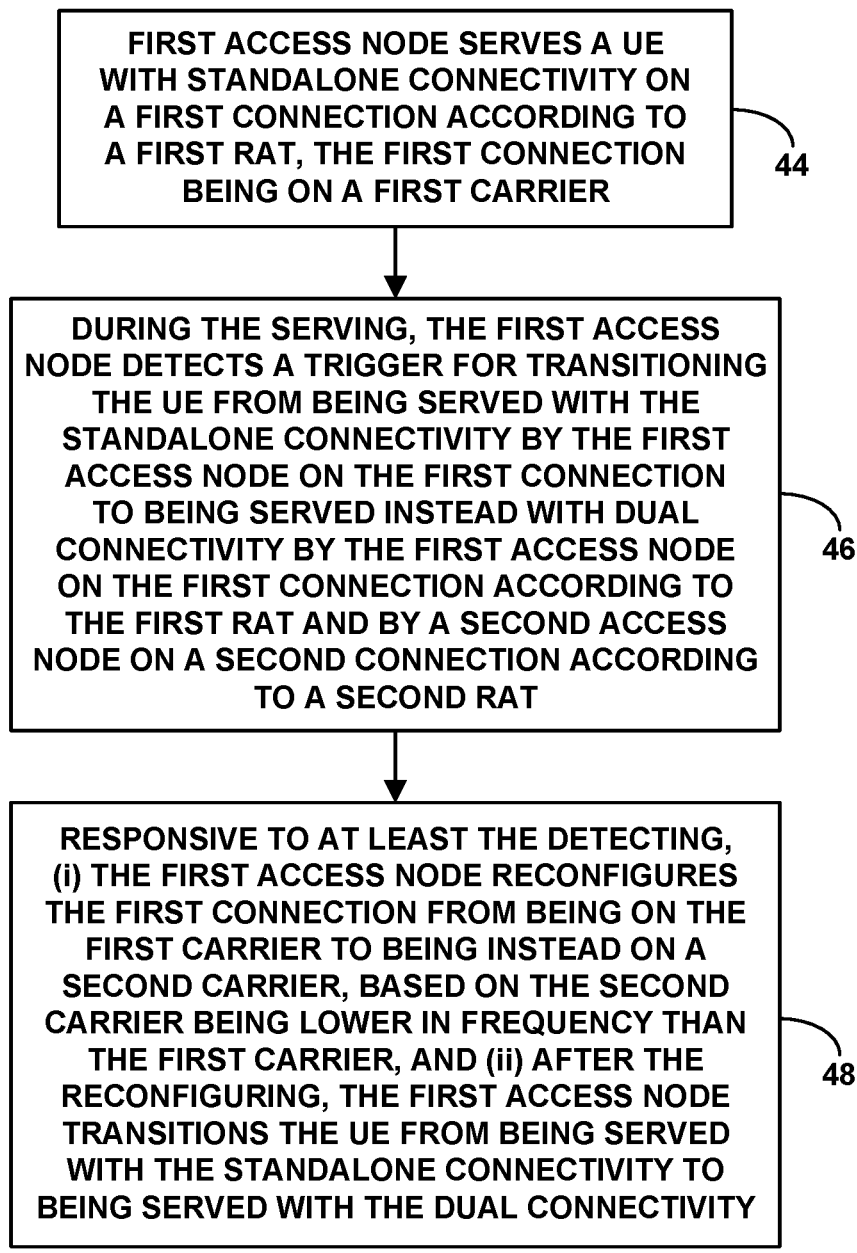
FIG. 2 is a flow chart depicting an example method in accordance with the disclosure.

FIG. 2 is a flow chart depicting an example method for controlling connectivity of a UE in this manner. This method could be implemented by a first access node such as access node 16 in FIG. 1, to help facilitate setup of dual-connectivity service for the UE and/or to improve likely quality of the UE's dual-connectivity service by improving likely quality of the UE's anchor carrier for the dual-connectivity service.

As shown in FIG. 2, at block 44, the method includes the first access node serving the UE with standalone connectivity on a first connection according to a first RAT, the first connection being on a first carrier. Further at block 44, the method includes, during the serving, the first access node detecting a trigger for transitioning the UE from being served with the standalone connectivity by the first access node on the first connection to being served instead with dual connectivity by the first access node on the first connection according to the first RAT and by a second access node on a second connection according to a second RAT.

And at block 46, the method includes, responsive to at least the detecting, (i) the first access node reconfiguring the first connection from being on the first carrier to being instead on a second carrier, based on the second carrier being lower in frequency than the first carrier, and (ii) after the reconfiguring (e.g., in response to the reconfiguring), the first access node transitioning the UE from being served with the standalone connectivity to being served with the dual connectivity.

In line with the discussion above, the act of detecting the trigger for transitioning the UE from being served with the standalone connectivity to being served instead with the dual connectivity could be based on a quality of service level of a communication in which the UE will be engaging, such as by detecting setup for the UE of a bearer having predefined threshold low packet-delay budget, among other possibilities. Thus, the act of detecting the trigger for transitioning the UE from being served with the standalone connectivity to being served instead with the dual connectivity could involve detecting that a user-plane communication in which the UE will be engaging is latency-sensitive.

As also discussed above, in this method, the first carrier could be defined within a first band and the second carrier could be defined in a second band that is lower in frequency than the first band. For instance, the first carrier could be a B41 carrier, and the second carrier could be a B25 carrier.

In addition, as discussed above, the carrier at issue in this method could be the sole carrier on which the first connection is defined. Thus, before the reconfiguration of the first connection, the first connection could be on only the first carrier, and after the reconfiguration, the first connection could be on only the second carrier. Alternatively, the carrier at issue could be the primary carrier for carrier-aggregation service on the first connection. Thus, before the reconfiguration, the first connection could be on the first carrier as a primary component carrier of carrier-aggregation, and after the reconfiguration, the first connection could be on the second carrier as the primary carrier of the carrier-aggregation.

Further, as discussed above, this method could additionally include, before reconfiguring the first connection, determining that the UE has predefined threshold weak signal strength on the first connection. And in that case, the reconfiguring of the first connection could be additionally responsive to the determining. For instance, in response to detecting the trigger for setting up dual-connectivity service for the UE, the first access node could then consider whether the UE's RSRP on the first carrier from the first access node is at least as low as a predefined threshold level. And if the RSRP is threshold low, then the first access node could proceed with the reconfiguring of the first connection before setting up dual connectivity for the UE. Whereas if the RSRP is not threshold low, then the first access node could forgo reconfiguring the first connection and could simply proceed to set up the dual connectivity for the UE.

Still further, as discussed above, the act of transitioning the UE from being served with the standalone connectivity to being served instead with the dual connectivity could involve the first access node engaging in signaling to coordinate setup for the UE of the second connection with the second access node and the first access node engaging in signaling to trigger setup of a split bearer for the UE.

As additionally discussed above, when a cellular system is serving multiple UEs with dual connectivity and all of the UE are served by a common first access node on the same carrier as each other, a further technical issue could arise. Namely, the first access node's air interface on that carrier could become threshold heavily loaded, which could result in the air interface having insufficient resources for accommodating communication needs of served UEs.

This could be a particular problem for dual-connectivity service, because each UE's first connection with the first access node is the anchor for the UE's dual-connectivity service, and because the carrier at issue is thus the anchor carrier for the UE's dual-connectivity service. If that anchor carrier becomes threshold heavily loaded, issues could thus arise with supporting each such UE's dual-connectivity service.

As noted above, the present disclosure could help address this problem where the first access node is configured to provide service on relatively high-frequency carrier 20 and a relatively-low frequency carrier 22, and where the carrier at issue is the relatively low-frequency carrier 22. That relatively low-frequency carrier 22 might become threshold heavily loaded as a result of many UEs initially connecting with the first access node on that carrier and/or as a result of the first access node reconfiguring UEs' first connections from being on the higher-frequency carrier 20 to being instead on the lower-frequency carrier 22, among other possible reasons.

Regardless of what gives rise to this situation, as noted above, the first access node could detect the situation and could then work address the situation by selectively transferring one or more UEs from each having the lower-frequency carrier 22 as its anchor carrier for dual connectivity to instead having higher-frequency carrier 20 as its anchor carrier for dual connectivity.

The first access node could regularly monitor the load on its air interface on lower-frequency carrier 22 and could detect when the level of load becomes at least predefined threshold high. Here, load could be measured in various ways. For example, load could be measured in terms of rate of control-channel and/or shared-traffic-channel resource occupancy, such as rate of PRB allocation, on average over a recent sliding window, on the uplink and/or downlink. Alternatively or additionally, load could be measured in terms of how many UEs are connected on the carrier. Other load metrics could be possible as well.

Upon detecting that the first carrier is threshold heavily loaded, the first access node could then select one or more UEs to each have its first connection with the first access node reconfigured from having the lower-frequency carrier 22 be the UE's anchor carrier for dual connectivity to instead having the higher-frequency carrier 20 be the UE's anchor carrier for dual connectivity.

As noted above, the selecting of each such UE for this purpose could be based on a determination that the UE is located within uplink communication range of the first access node on the higher-frequency carrier 20. Thus, the first access node could exclude from the selection one or more UEs based each such UE being located too far away from the first access node to be able to communicate to the first access node with sufficiently high quality on the higher-frequency carrier 20. Whereas, the first access node could include in the selection one or more UEs based on each such UE being located close enough to the first access node to be able to communicate to the first access node with the sufficiently high quality on the higher-frequency carrier 20.

To perform this selection from among the UEs that are each connected with the first access node on the lower-frequency carrier 22 as anchor carrier for dual connectivity, the first access node could determine the geographic location of each such UE and could compare that geographic location with predefined coverage mapping data that defines the geographic range of coverage of the first access node on the higher-frequency carrier 20.

For this purpose, the first access node could determine the geographic location of each such UE by receiving from the UE a report of the UE's geographic location and/or by using any of a variety of location-determination techniques. And the first access node could be provisioned with the predefined coverage mapping data that defines the geographic range of coverage of the first access node on the higher-frequency carrier 20.

For each UE that the first access node thus selects to have its first connection with the first access node reconfigured from having the lower-frequency carrier 22 be the UE's anchor carrier for dual connectivity to instead having the higher-frequency carrier 20 be the UE's anchor carrier for dual connectivity, the first access node could then engage in RRC signaling with the UE to reconfigure the UE's connection with the first access node from being on the lower-frequency carrier 22 to being on the higher-frequency carrier 20. Similar to the process discussed above, this could involve handing over the UE from one carrier to the other and/or swapping component carrier's used for carrier-aggregation service of the UE, among other possibilities.

Once the first access node has so reconfigured each selected UE's first connection have the higher-frequency carrier as anchor carrier for dual connectivity, the UE could then continue to be served with dual connectivity, now by the first access node on the reconfigured first connection and by the second access node on the second connection.

Figure 3:
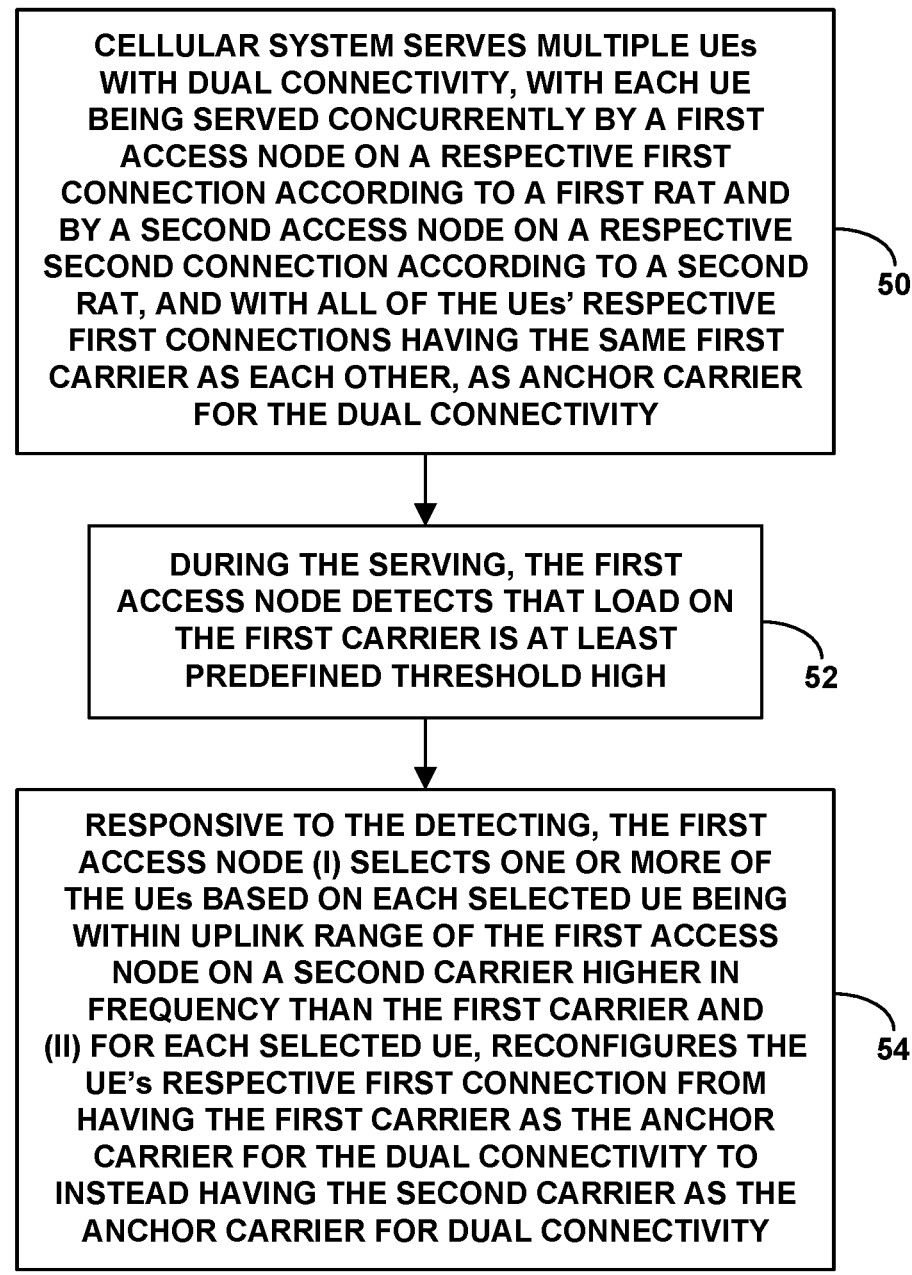
FIG. 3 is another flow chart depicting an example method in accordance with the disclosure.

FIG. 3 is a flow chart depicting an example method for controlling connectivity of a UE in this manner. Aspect of this method could be implemented by one or more entities in a cellular system such as that shown in FIG. 1, such as by first access node 16, to help maintain or facilitate dual-connectivity service for UEs. In this method, in contrast to that discussed above, the "first carrier" could be the lower-frequency carrier 22, and the "second carrier" could be the higher-frequency carrier 20. For instance, the first carrier could be defined in a first frequency band (e.g., B25) and the second carrier could be defined in a second frequency band (e.g., B41) higher in frequency than the first frequency band.

As shown in FIG. 3, at block 48, the cellular system could serve multiple UEs with dual connectivity, with each UE being served concurrently by a first access node on a respective first connection according to a first RAT and by a second access node on a respective second connection according to a second RAT, and with all of the UE's respective first connections having the same first carrier as each other, as anchor carrier for the dual connectivity. Further, at block 50, the method includes, during the serving, the first access node detecting that load on the first carrier is at least predefined threshold high. And at block 52, the method includes, responsive to the detecting, the first access node (i) selecting one or more of the UEs based on each selected UE being within uplink range of the first access node on a second carrier higher in frequency than the first carrier and (ii) for each selected UE, reconfiguring the UE's respective first connection from having the first carrier as the anchor carrier for the dual connectivity to instead having the second carrier as the anchor carrier for dual connectivity.

In line with the discussion above, the first carrier could define multiple PRBs per unit time, and the act of detecting that the load on the first carrier is predefined threshold high could involve detecting that a rate of allocation of the PRBs is at least predefined threshold high. Alternatively, detecting the threshold high load could take other forms.

Further, as discussed above, the act of selecting one or more of the UEs based on each of the selected one or more UEs being within uplink range of the first access node on the second carrier could involve selecting the one or more UEs based on determining that a respective geographic location of each of the selected one or more UEs is within a predefined uplink geographic range of the first access node on the second carrier. As such, this could involve excluding, from the selecting, one or more other of the UEs based on the one or more other UEs each not being within the predefined uplink geographic range of the first access node on the second carrier.

Here again, the carrier at issue could be the sole carrier on which the first connection is defined. Thus, for each selected UE, before the reconfiguration of the first connection, the first connection could be on only the first carrier, and after the reconfiguration, the first connection could be on only the second carrier.

And alternatively, the carrier at issue could be the primary carrier for carrier-aggregation service on the first connection. Thus, for each selected UE, before the reconfiguration, the first connection could be on the first carrier as a primary component carrier of carrier-aggregation and with the second carrier as one of one or more secondary carriers for the carrier-aggregation service, and after the reconfiguration, the first connection could be on the second carrier as the primary carrier of the carrier-aggregation service and the first carrier could be one of the one or more secondary carriers for the carrier-aggregation service.

Yet further, as discussed above, for each selected UE, the act of reconfiguring the UE's respective first connection could involve transmitting from the first access node to the UE a connection-reconfiguration message that directs reconfiguration of the UE's respective first connection to be on the second carrier instead of on the first carrier.

Figure 4:
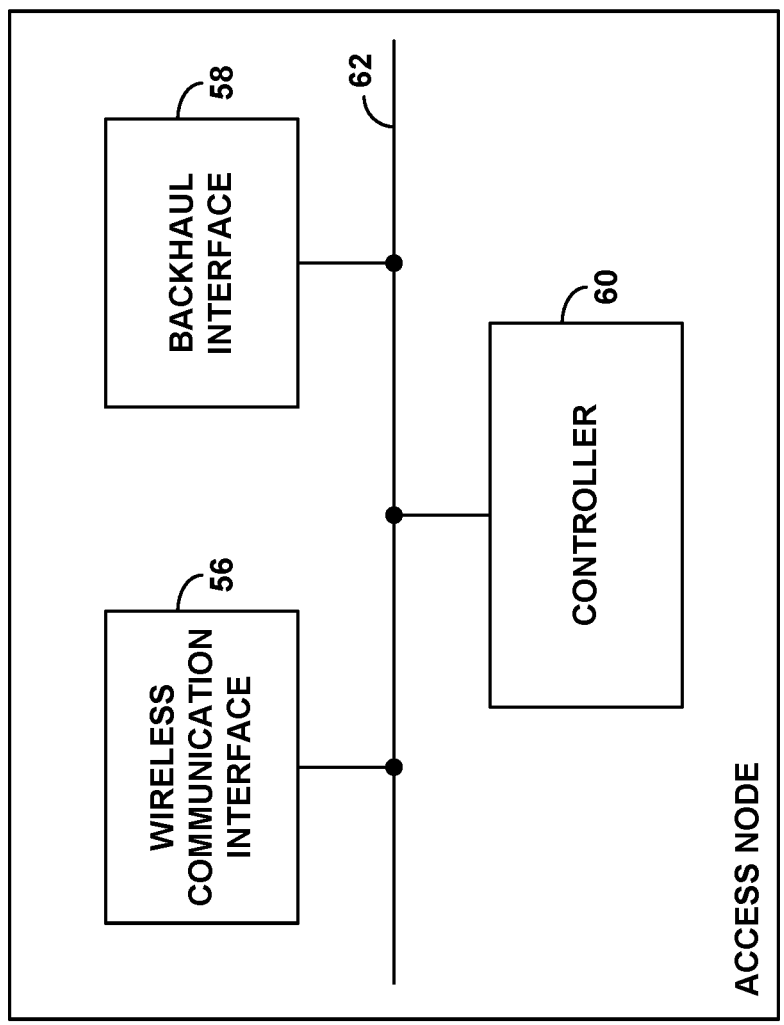
FIG. 4 is a simplified block diagram of an example access node operable in accordance with the disclosure.

Finally, FIG. 4 is a simplified block diagram of an example access node, which could be first access node 16 in FIG. 1, representing by way of example how a cellular system of FIG. 1, including the first access node and the second access node, could be configured to carry out various disclosed operations, including various features described above for instance.

As shown in FIG. 4, the example access node includes a wireless communication interface 54, a backhaul interface 56, and a controller 58, all of which may be communicatively linked together by a system bus, network, or other connection mechanism 60 and/or could be integrated together or distributed in various ways.

In this example arrangement, the wireless communication interface 56 could be configured to provide cellular coverage and to engage in air interface communication with served UEs. As such, wireless communication interface 56 could comprise an antenna structure, which could be tower mounted or could take other forms, and associated components such as a power amplifier and a wireless transceiver, to facilitate providing a coverage area on multiple carriers as shown in FIG. 1 and engaging in transmission and reception of control-plane and user-plane communications in accordance with a RAT such as any of those noted above. Further, backhaul interface 56 could comprise a wired or wireless interface, such as an Ethernet network communication interface, configured to support communication with other entities, such as with various core network entities and other access nodes for instance.

Controller 58 could then comprise control logic to cause the first access node to carry out particular operations including those described herein. As such, the controller 58 could take various forms, including but not limited to a processing unit including one or more processors (e.g., one or more general purpose microprocessors and/or one or more dedicated processing units) and non-transitory data storage (e.g., one or more volatile and/or non-volatile storage components, such as magnetic, optical, or flash storage) holding program instructions executable by the processing unit to cause the first access node to carry out various operations described herein and thus to control operation of the first access node.

It should also be understood that the present disclosure additionally contemplates a non-transitory computer readable medium that stores, has encoded thereon, or otherwise embodies program instructions executable to carry out such operations as well.

With this or other arrangements, the cellular system could thus be configured to serve multiple UEs with dual connectivity, where each UE is served concurrently by the first access node on a respective first connection according to a first RAT and by the second access node on a respective second connection according to a second RAT, and where all of the UE's respective first connections have a first carrier as anchor carrier for the dual connectivity.

Further, the cellular system could be configured to detect, during the serving, that load on the first carrier is at least predefined threshold high. And the cellular system could be configured to respond to the detecting by (i) selecting one or more of the UEs based on each of the selected one or more UEs being within uplink range of the first access node on a second carrier higher in frequency than the first carrier and (ii) for each selected UE, reconfiguring the UE's respective first connection from having the first carrier as the anchor carrier for the dual connectivity to instead having the second carrier as the anchor carrier for dual connectivity.

Exemplary embodiments have been described above. Those skilled in the art will understand, however, that changes and modifications may be made to these embodiments without departing from the true scope and spirit of the invention.

We claim:

1. A method for controlling connectivity of a user equipment device (UE), the method comprising:
    serving by a first access node the UE with standalone connectivity on a first connection, wherein the first connection is on a first carrier;
    during the serving, detecting by the first access node a trigger for transitioning the UE from being served with the standalone connectivity by the first access node on the first connection to being served instead with dual connectivity by the first access node on the first connection and by a second access node on a second connection; and
    responsive to at least the detecting, (i) reconfiguring, by the first access node, the first connection from being on the first carrier to being instead on a second carrier, based on the second carrier being lower in frequency than the first carrier, and (ii) after the reconfiguring, transitioning, by the first access node, the UE from being served with the standalone connectivity to being served with the dual connectivity.

2. The method of claim 1, wherein detecting the trigger for transitioning the UE from being served with the standalone connectivity to being served instead with the dual connectivity is based on a quality of service level of a communication in which the UE will be engaging.

3. The method of claim 2, wherein detecting the trigger comprises detecting setup for the UE of a bearer having a predefined threshold low packet-delay budget.

4. The method of claim 1, wherein detecting the trigger for transitioning the UE from being served with the standalone connectivity to being served instead with the dual connectivity comprises detecting that a communication in which the UE will be engaging is latency-sensitive.

5. The method of claim 1, wherein the first carrier is defined in a first band, wherein the second carrier is defined in a second band, and wherein the second band is lower in frequency than the first band.

6. The method of claim 1,
    wherein, before the reconfiguring, the first connection is on only the first carrier, and
    wherein, after the reconfiguring, the first connection is on only the second carrier.

7. The method of claim 1,
    wherein, before the reconfiguring, the first connection is on the first carrier as a primary component carrier of carrier-aggregation, and
    wherein, after the reconfiguring, the first connection is on the second carrier as the primary carrier of the carrier-aggregation.

8. The method of claim 1,
    wherein the first and second connections are on different radio access technologies than each other,
    wherein, before the reconfiguring, the first connection has the first carrier as a primary component carrier of carrier-aggregation and has the second carrier as one of one or more secondary component carriers of the carrier-aggregation, and
    wherein, after the reconfiguring, the first connection has the second carrier as the primary carrier of the carrier-aggregation and has the first carrier as one of one or more secondary component carriers of the carrier-aggregation.

9. The method of claim 1, wherein the transitioning after the reconfiguring is responsive to the reconfiguring.

10. The method of claim 1, further comprising, before the reconfiguring, determining that the UE has predefined threshold weak signal strength on the first connection, wherein the reconfiguring is additionally responsive to the determining.

11. The method of claim 10, wherein the predefined threshold weak signal strength comprises predefined threshold low reference-signal-receive-power (RSRP).

12. The method of claim 1, wherein transitioning the UE from being served with the standalone connectivity to being served instead with the dual connectivity comprises:
    engaging in signaling by the first access node to coordinate setup for the UE of the second connection; and
    engaging in signaling by the first access node to trigger setup of a split bearer for the UE.

13. The method of claim 1, wherein the first connection is a 4G Long Term Evolution (4G LTE) connection, the second connection is a 5G New Radio (5G NR) connection, and the dual connectivity is EUTRA-NR Dual Connectivity (EN-DC).

14. The method of claim 1, wherein the first and second connections are on different radio access technologies than each other, and wherein detecting the trigger is based on deep packet inspection.

15. A non-transitory computer-readable medium embodying program instructions executable by a processing unit to cause a first access node to carry out operations including:
    serving a user equipment device (UE) with standalone connectivity on a first connection, wherein the first connection is on a first carrier;
    during the serving, detecting a trigger for transitioning the UE from being served with the standalone connectivity by the first access node on the first connection to being served instead with dual connectivity by the first access node on the first connection and by a second access node on a second connection; and
    responsive to at least the detecting, (i) reconfiguring the first connection from being on the first carrier to being instead on a second carrier, based on the second carrier being lower in frequency than the first carrier, and (ii) after the reconfiguring, transitioning the UE from being served with the standalone connectivity to being served with the dual connectivity.

16. The non-transitory computer-readable medium of claim 15, wherein the first and second connections are according to different radio access technologies than each other.

17. The non-transitory computer-readable medium of claim 15, wherein detecting the trigger for transitioning the UE from being served with the standalone connectivity to being served instead with the dual connectivity is based on a quality of service level of a communication in which the UE will be engaging.

18. The non-transitory computer-readable medium of claim 15, wherein the transitioning after the reconfiguring is responsive to the reconfiguring.

19. The non-transitory computer-readable medium of claim 15, wherein the operations additionally include determining, before the reconfiguring, that the UE has predefined threshold weak signal strength on the first connection, wherein the reconfiguring is additionally responsive to the determining.

20. The non-transitory computer-readable medium of claim 15,
   wherein, before the reconfiguring, the first connection is on the first carrier as a primary component carrier of carrier-aggregation, and
   wherein, after the reconfiguring, the first connection is on the second carrier as the primary carrier of the carrier-aggregation.

\* \* \* \* \*